US012722966B1

(12) United States Patent
Yang

(10) Patent No.: US 12,722,966 B1
(45) Date of Patent: Sep. 1, 2026

(54) OIL BARREL OUTLET NOZZLE

(71) Applicant: Ruobing Yang, Zhejiang (CN)

(72) Inventor: Ruobing Yang, Zhejiang (CN)

( * ) Notice: Subject to any disclaimer, the term of this patent is extended or adjusted under 35 U.S.C. 154(b) by 0 days.

(21) Appl. No.: 19/278,638

(22) Filed: Jul. 23, 2025

(51) Int. Cl.
*B67D 7/04* (2010.01)
*B67D 7/36* (2010.01)

(52) U.S. Cl.
CPC ................. *B67D 7/04* (2013.01); *B67D 7/36* (2013.01)

(58) Field of Classification Search
CPC . B67D 7/04; B67D 7/36; B65D 25/48; B65D 47/32; B65D 47/06
USPC .................................. 141/392; 222/514, 484
See application file for complete search history.

(56) References Cited

U.S. PATENT DOCUMENTS 5,076,333 A * 12/1991 Law ..................... B65D 47/283 141/335
5,228,487 A * 7/1993 Thiermann ............ B67D 7/005 215/261
5,507,328 A * 4/1996 Donovan ............... B67D 7/005 141/357
5,628,352 A * 5/1997 Gracyalny ............. B67D 7/005 222/189.1
6,227,419 B1 * 5/2001 Raboin .................. B67D 7/005 222/525
6,598,630 B1 * 7/2003 Trippi, Jr. .............. B67D 7/005 141/352
8,201,595 B2 * 6/2012 Trippi, Jr. .............. B67D 7/005 141/366
8,602,273 B2 * 12/2013 Carter ...................... B67D 7/06 222/484
8,800,826 B2 * 8/2014 Forbis .................... B67D 7/005 222/484
9,783,404 B2 * 10/2017 Van Gelder ............ B65D 47/32
10,683,148 B2 * 6/2020 Adam .................... B65D 47/32
11,827,424 B2 * 11/2023 Vachon .................. B67D 7/005

* cited by examiner

*Primary Examiner* — Kenneth Rinehart
*Assistant Examiner* — Stephanie A Shrieves
(74) *Attorney, Agent, or Firm* — Hawaii Patent Services; Nathaniel K. Fedde; Kenton N. Fedde

(57) ABSTRACT

The present disclosure relates to an oil barrel outlet nozzle, which comprises a fixed pipe, a closing mechanism slidably arranged therein, and an oil outlet pipe, which are connected through a rigid linkage structure. The linkage structure responds to the sliding of the oil outlet pipe to drive the movement of the closing mechanism while isolating the motion transfer between the two, ensuring that the sealing interface between the closing mechanism and the fixed pipe remains independent of wear on the oil outlet pipe. Through the O-ring seal between a sealing plate and a protrusion and the synergistic action of a pneumatic balancing device and a limiting mechanism, the sealing reliability and service life are significantly improved.

11 Claims, 10 Drawing Sheets

OIL BARREL OUTLET NOZZLE

TECHNICAL FIELD

The present disclosure relates to the technical field of outlet nozzles, particularly to an oil barrel outlet nozzle.

BACKGROUND

In traditional oil barrel outlet nozzle designs, the oil outlet pipe and the internal valve closure system (such as a plug, ball valve, or tapered valve core) commonly adopt a rigid integrated structure. This design rigidly connects the oil outlet pipe, which is susceptible to dynamic loads, with the valve core/valve stem responsible for critical sealing, forming the core of its inherent defects.

Frequent daily opening and closing of valves and the lateral forces generated by oil gun operations force the entire integrated structure (comprising the oil outlet pipe and valve core) to rotate or move axially. This forced motion causes continuous, irreversible mechanical friction and wear at the mating surface between the root of the oil outlet pipe and the fixed valve seat (or valve body). Wear at the root mating surface directly leads to an increase in the mating gap. More critically, the wear caused by the movement of the oil outlet pipe and the resulting gap changes will inevitably propagate to the sealing interface between the valve core/valve stem and the valve seat. The increased gap not only directly weakens sealing performance but also induces structural wobbling, further exacerbating stress and loosening risks at other associated fastening points, creating a vicious cycle. This wear significantly increases the risk of oil leakage and severely compromises the overall stability and long-term reliability of the device.

SUMMARY

The present disclosure provides an oil barrel outlet nozzle to address the issues raised in the background.

To achieve the above object, the present disclosure adopts the following technical solution:

An oil barrel outlet nozzle comprises a fixed pipe, comprising an oil inlet and an oil discharge port; a closing mechanism arranged on the oil inlet of the fixed pipe, with a first sealing member at a bottom thereof for opening and closing an oil passage of the oil inlet; an oil outlet pipe slidably inserted into the oil discharge port, with a second sealing member on an outer wall thereof for sealing a gap between the oil outlet pipe and the fixed pipe; and a linkage structure arranged between the oil outlet pipe and the closing mechanism. The first sealing member and the second sealing member are physically isolated and operate independently; and the linkage structure converts an axial displacement of the oil outlet pipe into an opening/closing motion of the closing mechanism.

The beneficial effects of the present disclosure compared to the prior art are: the linkage structure enables the oil outlet pipe and the closing mechanism to each have an independent sealing system, ensuring the first sealing member and the second sealing member are physically isolated and operate independently; when wear occurs in the oil outlet pipe due to operation, the resulting gap changes will not propagate to the sealing interface of the closing mechanism, completely eliminating the risk of sealing failure caused by structural wobbling and ensuring long-term zero-leakage operation.

BRIEF DESCRIPTION OF DRAWINGS

The drawings, which form part of this application, are included to provide a further understanding of the present disclosure. The illustrative embodiments of the present disclosure and the descriptions thereof are intended to explain the present disclosure and do not constitute an undue limitation of the present disclosure. In the drawings.

Figure 1:
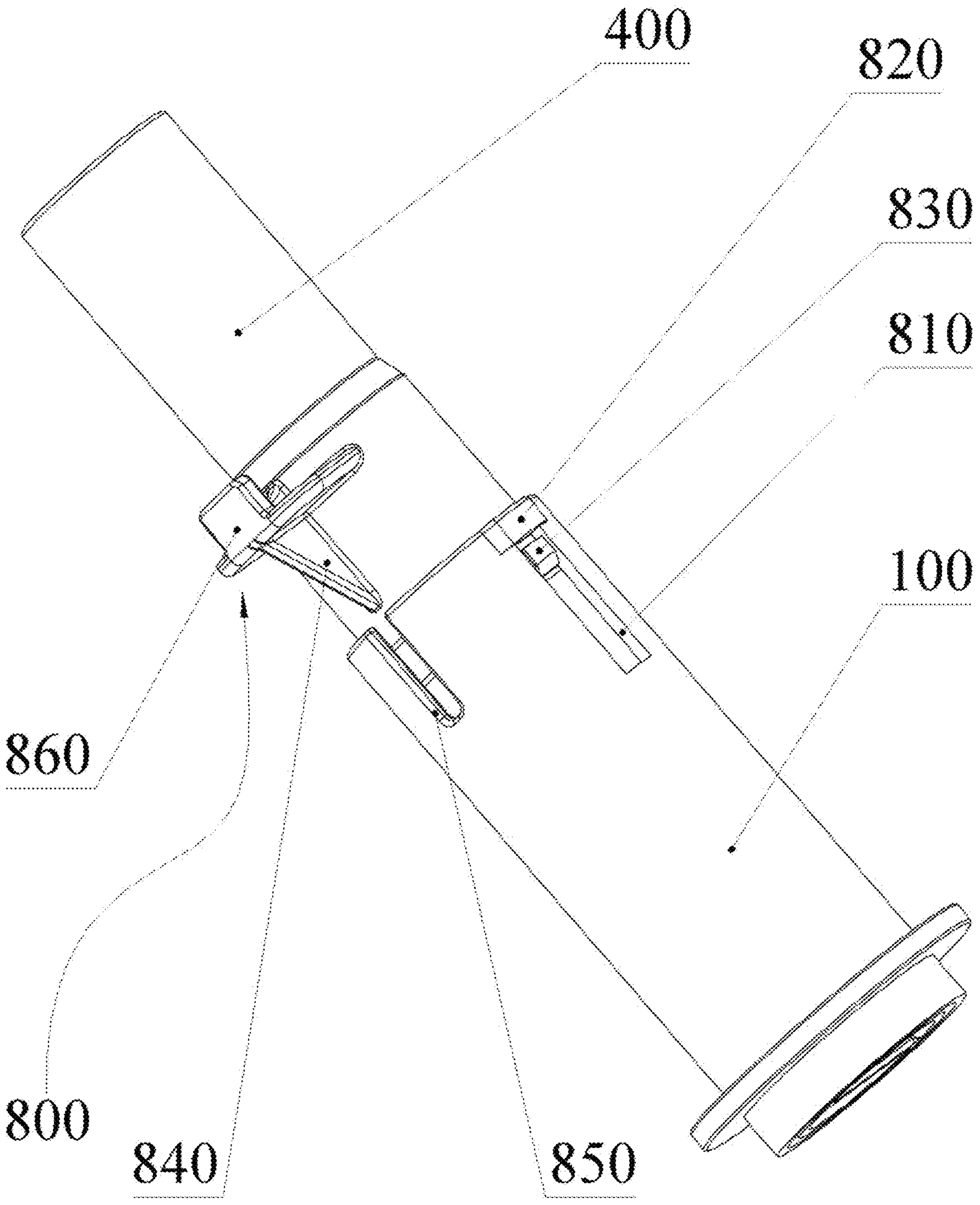
FIG. 1 is a perspective schematic view of an embodiment provided by the present disclosure.

Reference signs: Fixed pipe (100); Oil inlet (110); Oil discharge port (111); Protrusion (120); Closing mechanism (200); Sealing plate (210); First sealing member (300); Annular groove (310), First sealing ring (320); Oil outlet pipe (400); Second sealing member (500); Recess (510); Second sealing ring (520); Linkage structure (600); Connecting plate (610); Limiting step (620); First spring (630); Mounting plate (640); Mounting cylinder (650); Connecting post (660); Second spring (670); Air duct (700); Air inlet (710); Air outlet (720); Limiting mechanism (800); Sliding groove (810); Limiting block (820); Fixed block (830); Pressing plate (840); Limiting groove (850); Limiting plate (860); Threaded cap (900); Helical tooth (910); Anti-return cap (920); Paddle (930); Fixed tooth (940).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 2:
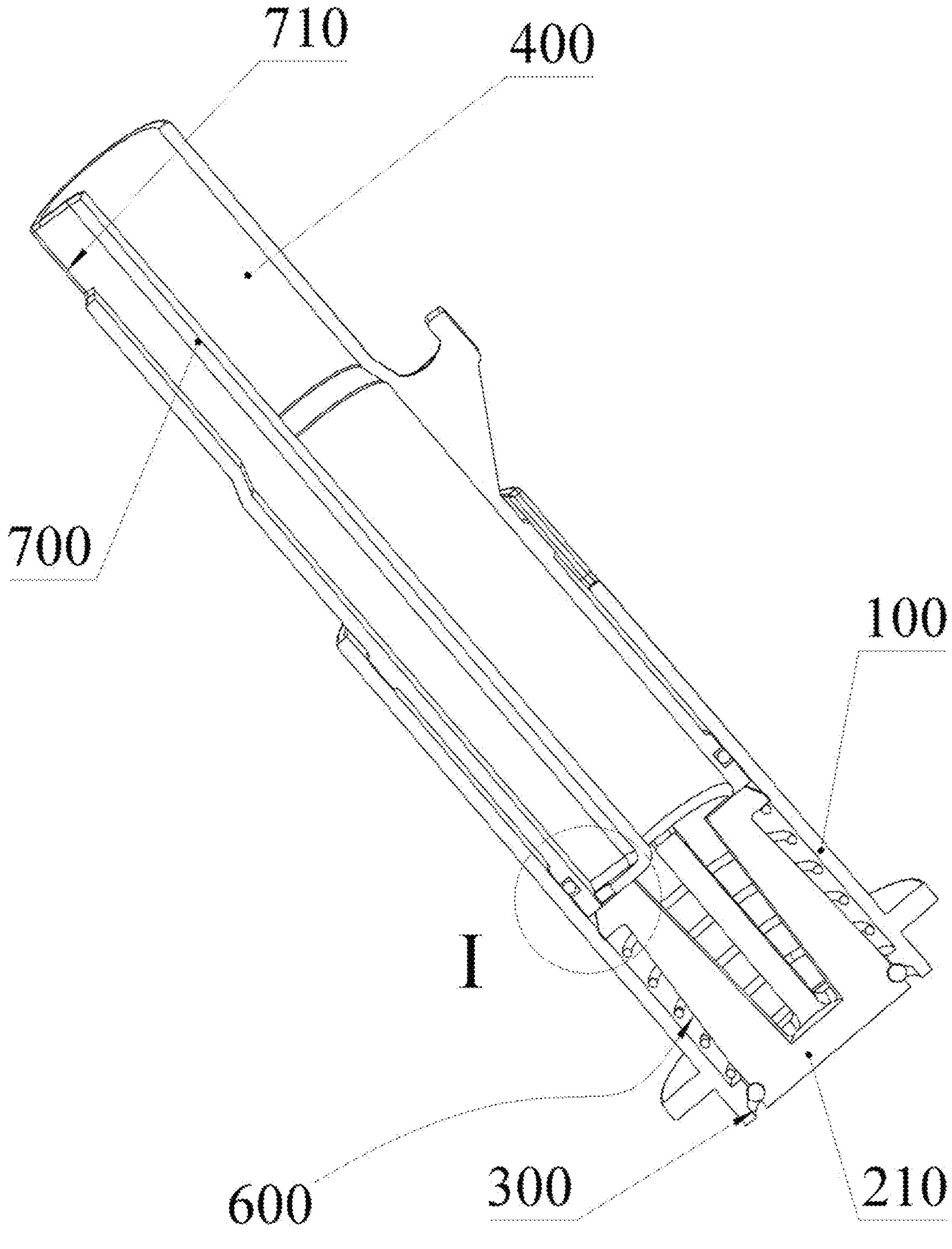
FIG. 2 is a perspective cross-sectional view of the embodiment shown in FIG. 1.

An oil barrel outlet nozzle includes a fixed pipe 100 and an Oil outlet pipe 400 arranged inside the fixed pipe 100 (refer to FIGS. 1 and 2).

Figure 4:
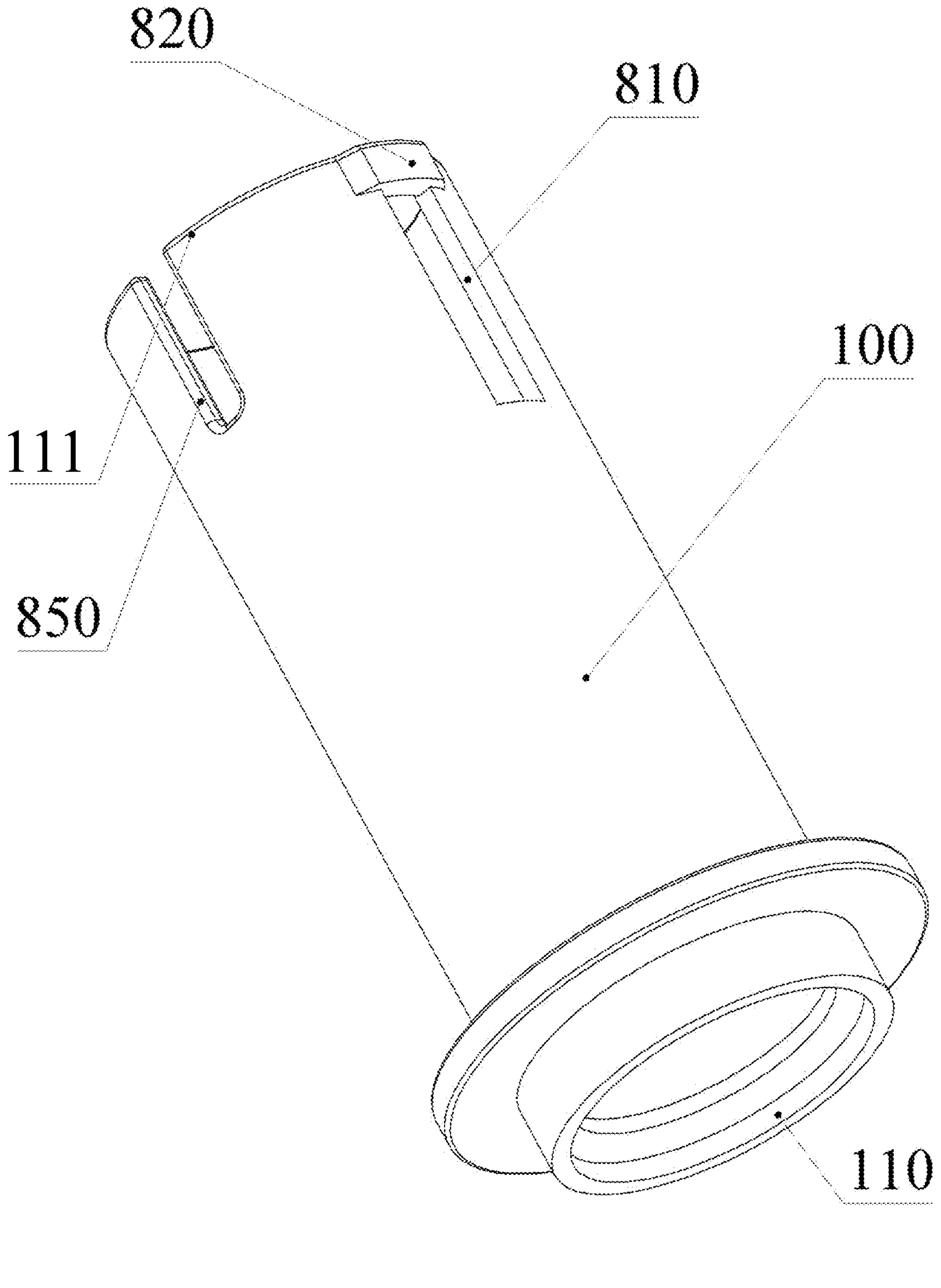
FIG. 4 is a structural schematic diagram of the fixed pipe in the embodiment shown in FIG. 1.
Figure 6:
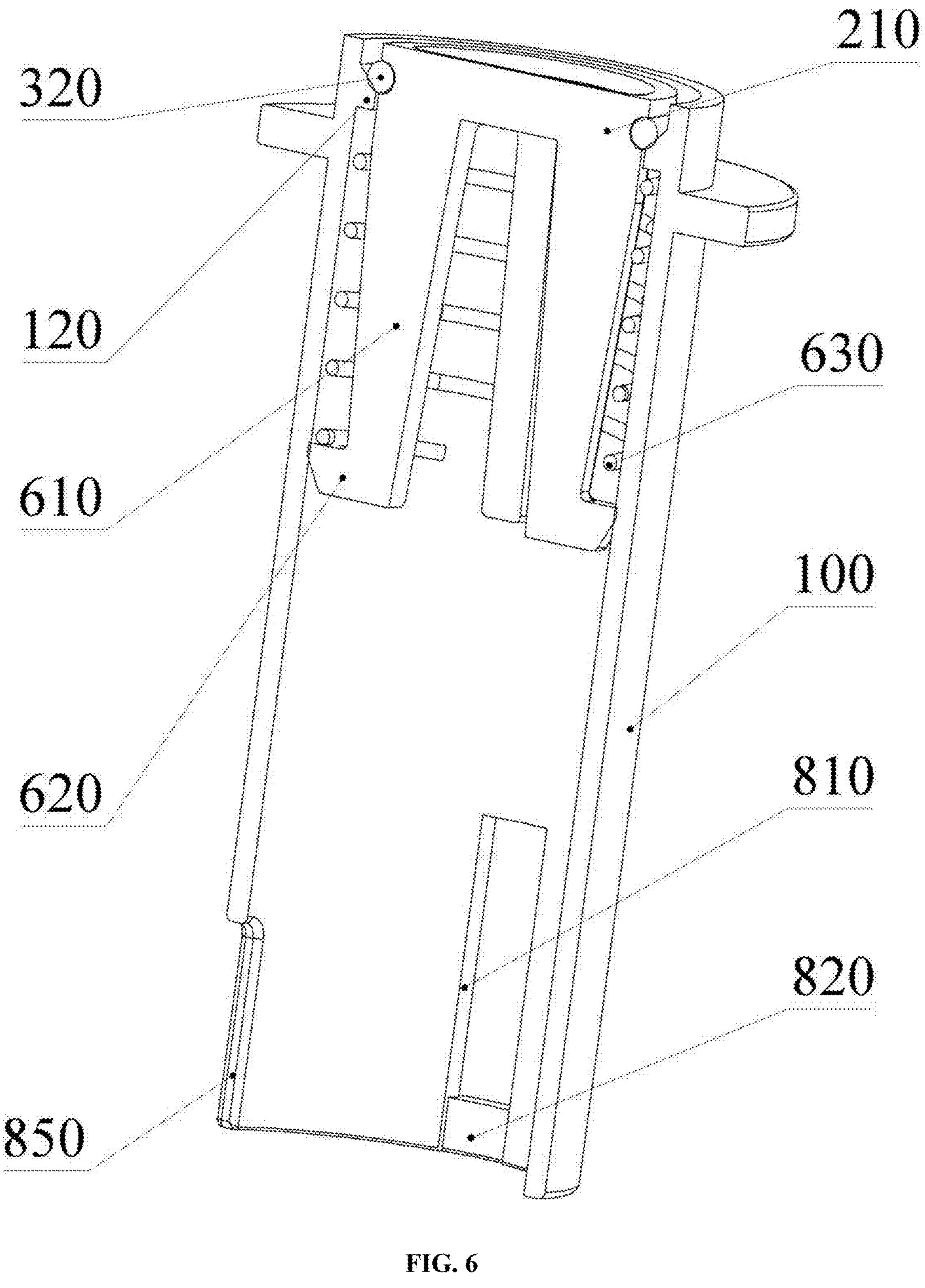
FIG. 6 is a perspective cross-sectional view of the embodiment shown in FIG. 4.

In this embodiment, referring to FIGS. 4 and 6, the fixed pipe 100 includes an oil inlet 110 and an oil discharge port. The inner wall of the oil inlet 110 is provided with a closing mechanism 200. When the closing mechanism 200 is closed, oil in the storage tank cannot enter the fixed pipe 100. When the closing mechanism 200 is opened, oil in the storage tank can smoothly enter the fixed pipe 100.

In other embodiments, referring to FIG. 6, the closing mechanism 200 includes a sealing plate 210. A first sealing member 300 is arranged on the side wall of the sealing plate 210 and can be used to open or close the oil passage of the oil inlet 110.

Figure 7:
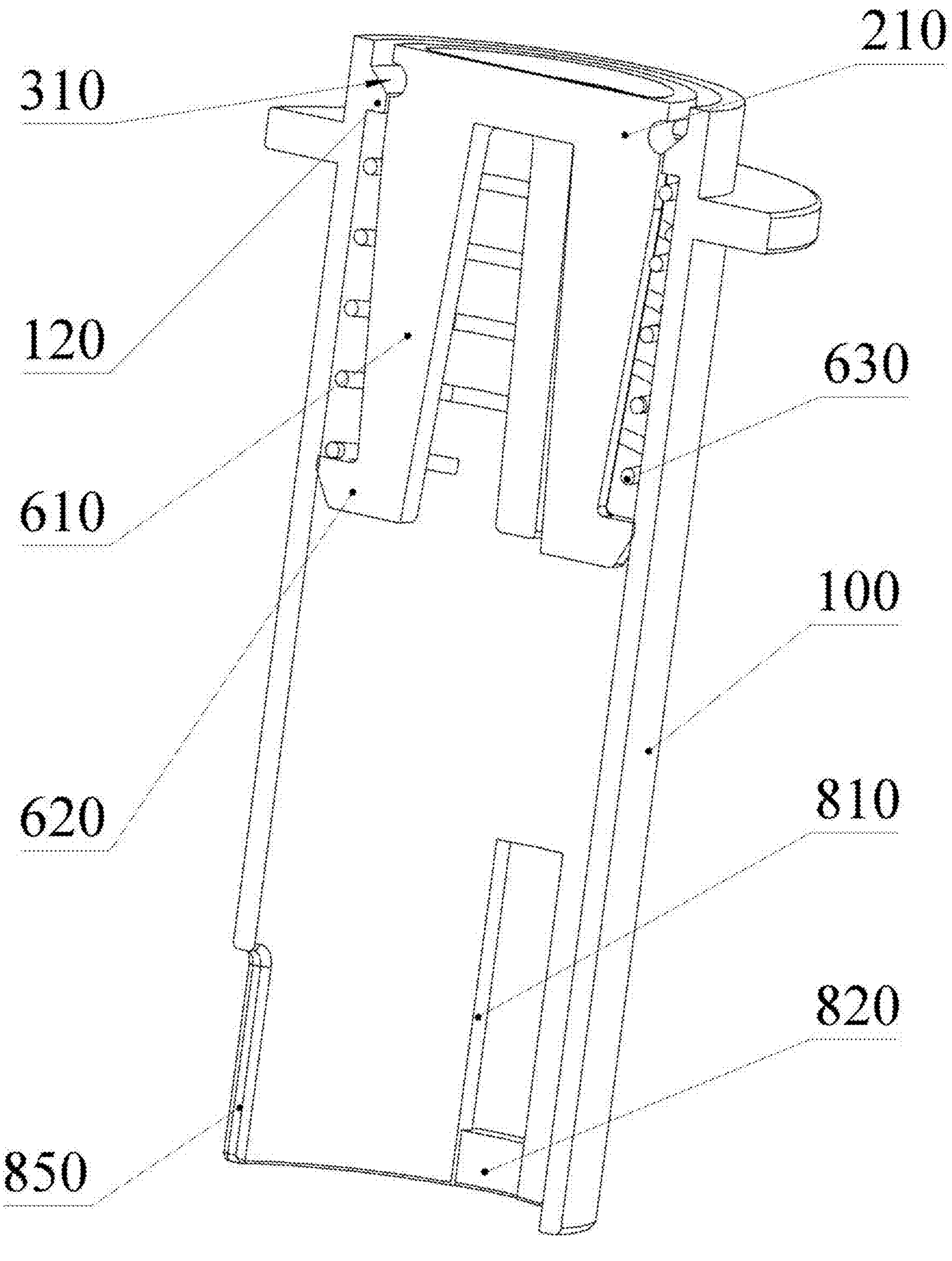
FIG. 7 is another schematic diagram of the embodiment shown in FIG. 4.

In other embodiments, referring to FIGS. 6 and 7, the first sealing member 300 includes an annular groove 310 formed on the outer side wall of the sealing plate 210. A first sealing ring 320 is arranged inside the annular groove. A protrusion 120 is fixed on the inner wall of the fixed pipe 100 opposite the annular groove 310. One side of the first sealing ring 320 contacts the surface of the protrusion 120. When the sealing plate 210 is closed, it drives the first sealing ring 320 to press tightly against the surface of the protrusion 120, forming a self-adaptive high-pressure sealing interface, thereby improving the sealing performance of the product.

In other embodiments (not shown), the first sealing ring 320 and the protrusion 120 are omitted. Instead, a permanent magnet ring is embedded in the side wall of the sealing plate 210, and an electromagnetic coil is arranged at the corresponding position of the fixed pipe 100. When the sealing plate 210 is closed, the electromagnetic coil is energized to generate a magnetic field repelling the permanent magnet ring, pushing the sealing plate 210 tightly against the inner wall of the fixed pipe 100 to form a magnetically-enhanced contact seal.

In other embodiments (not shown), the sidewall of the sealing plate 210 is processed with a microhole array, the bottom of the microholes connects to a vacuum cavity, and the cavity is linked to a miniature vacuum pump through a one-way valve. When the sealing plate 210 approaches the closed position: the vacuum pump is activated to suction air from the microholes, causing the sealing plate 210 to tightly adhere to the inner wall of the fixed pipe 100 under negative pressure adsorption. This structure eliminates the need for spring preload, resolving leakage issues with low-viscosity oils (e.g., kerosene).

Figure 3:
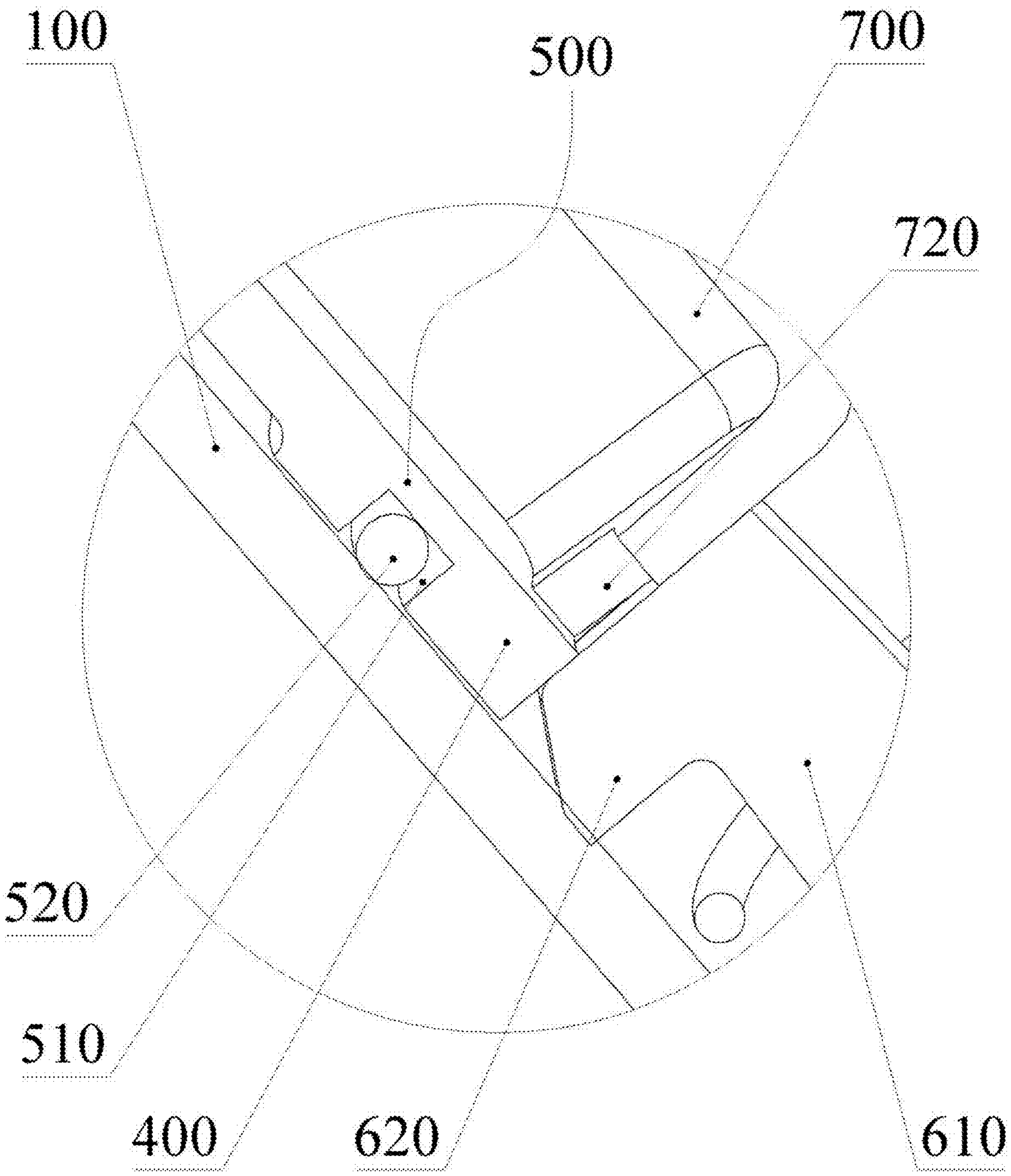
FIG. 3 is a structural schematic diagram of part I in the embodiment shown in FIG. 2.

In this embodiment, referring to FIGS. 2 and 3, the oil outlet pipe 400 is slidably arranged on the oil discharge port of the fixed pipe 100, and the inner wall of the oil outlet pipe 400 is provided with a second sealing member 500.

Figure 5:
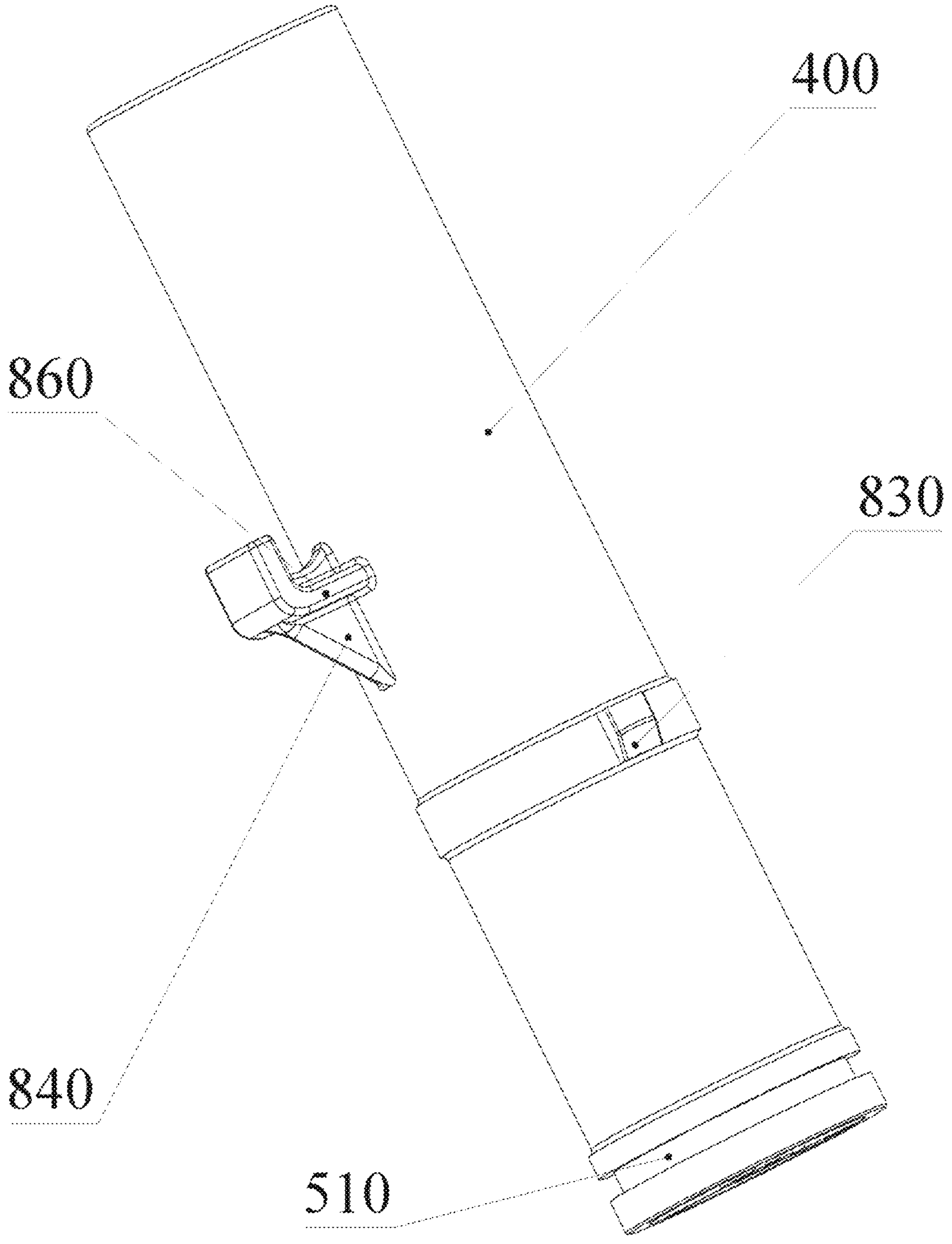
FIG. 5 is a structural schematic diagram of the oil outlet pipe in the embodiment shown in FIG. 1.

In other embodiments, referring to FIGS. 3 and 5, the second sealing member 500 includes an annular recess 510 formed on the outer edge of the oil outlet pipe 400, with a second sealing ring 520 placed inside the recess. One side of the second sealing ring 520 contacts the outer surface of the fixed pipe 100. The second sealing ring 520 is compressed between the inner wall of the recess 510 in the oil outlet pipe 400 and the inner wall of the fixed pipe 100, forming a tight annular sealing band that effectively prevents oil from leaking outward through the annular gap between the oil outlet pipe 400 and the fixed pipe 100, avoiding oil loss, environmental pollution, equipment contamination, and potential safety hazards.

In other embodiments (not shown), the radial recess on the oil outlet pipe 400 is eliminated. A horizontally placed O-ring is installed between the end face of the fixed pipe 100 and the end face of the oil outlet pipe 400. When the flange or threaded portion of the oil outlet pipe 400 is tightened to the fixed pipe 100, the O-ring is axially compressed between the two planes, creating a radial leakage barrier.

In this embodiment, referring to FIG. 2, a linkage structure 600 is arranged between the oil outlet pipe 400 and the sealing plate 210. By incorporating the linkage structure 600, the oil outlet pipe 400 and the closing mechanism 200 each maintain an independent sealing system, ensuring physical isolation and independent operation of the first sealing member 300 and the second sealing member 500. When wear occurs on the second sealing member 500 on the surface of the oil outlet pipe 400 due to operation, the resulting gap change does not transfer to the first sealing member 300 of the closing mechanism 200, completely eliminating the risk of sealing failure caused by structural wobbling. This ensures long-term zero-leakage operation, prevents sealing integrity issues due to wear-induced wobbling in integrated structures, and guarantees that the oil barrel outlet nozzle maintains excellent sealing performance during use, preventing oil leakage and enhancing the stability and reliability of the device.

In other embodiments, referring to FIG. 6, the linkage structure 600 includes at least one connecting plate 610 fixedly mounted on the bottom surface of the sealing plate 210. The end of the connecting plate 610 away from the sealing plate 210 is connected to the top of the oil outlet pipe 400. A limiting step 620 is fixedly installed on the side of the connecting plate 610 facing the fixed pipe 100. A first spring 630 is fixedly mounted on the top of the limiting step 620, and the first spring 630 is sleeved on the surface of the connecting plate 610. The end of the first spring 630 away from the limiting step 620 is connected to the bottom of the protrusion 120.

During normal operation of the device, the sealing plate 210 is in the open state, allowing oil to flow smoothly into the oil inlet 110. When it is necessary to suspend oil supply and close the oil inlet 110, the operator pulls the oil outlet pipe 400 outward, causing the oil outlet pipe 400 to undergo axial displacement parallel to the fixed pipe 100. The oil outlet pipe 400 drives the sealing plate 210 to move toward the closed position through the connecting plate 610, ultimately causing the sealing plate 210 to fully cover and seal the oil inlet 110. When oil supply needs to be restored, the operator releases the oil outlet pipe 400. At this time, the connecting plate 610 quickly resets under the elastic potential energy stored in the internal first spring 630, and the reset action simultaneously moves the sealing plate 210 away from the oil inlet 110, reopening the oil passage.

In other embodiments (not shown), the first sealing ring and the protrusion/permanent magnet ring/vacuum microholes are omitted. An annular thermal expansion alloy ring (such as copper-nickel alloy) is embedded in the sidewall of the sealing plate 210, and an annular electric heating wire (connected to a temperature controller) is installed at the corresponding position of the fixed pipe 100. When the sealing plate 210 is closed, the temperature controller supplies power to heat the annular region. The thermal expansion alloy ring expands radially under heat, tightly pressing against the inner wall of the fixed pipe 100 to form a seal. The higher the temperature, the greater the sealing pressure, making it particularly suitable for high-temperature oils (such as thermal oil). During shutdown, heating stops, allowing the alloy ring to contract for easy reopening next time.

Figure 8:
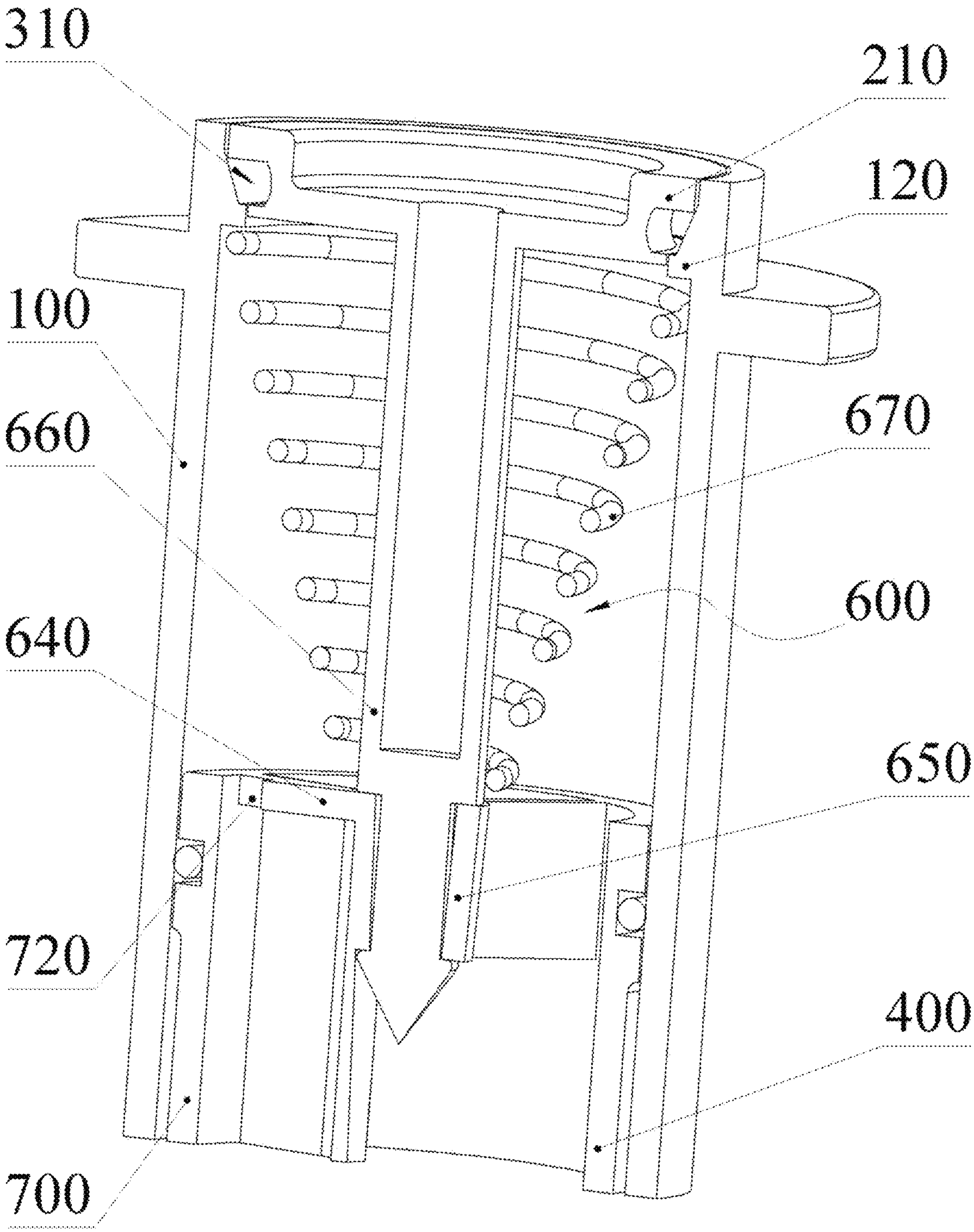
FIG. 8 is a structural schematic diagram of the linkage structure in another embodiment provided by the present disclosure.

In other embodiments of the linkage structure 600, referring to FIG. 8, the linkage structure 600 includes at least two mounting plates 640 fixedly installed on the inner wall of the oil outlet pipe 400. The end of the multiple mounting plates 640 away from the oil outlet pipe 400 is fixedly provided with a mounting cylinder 650. A connecting post 660 is fixedly installed on the bottom surface of the sealing plate 210, and the other end of the connecting post 660 is fixedly inserted into the mounting cylinder 650. A second spring 670 is fixedly mounted on the top of the mounting plate 640, and the other end of the second spring 670 is fixedly installed at the bottom of the protrusion 120.

In other embodiments (not shown), an electromagnetic ring is fixedly installed on the inner wall of the mounting cylinder 650, and an iron plate is fixedly installed on the surface of the connecting post 660, enabling the connecting post 660 and the mounting cylinder 650 to achieve detachable connection. This facilitates the later disassembly of the oil outlet pipe 400 by maintenance personnel for repairs.

In other embodiments (not shown), a filter screen is fixedly installed between two adjacent mounting plates 640. Since oil (especially lubricating oil or hydraulic oil) may form sediment at the bottom due to the settling of impurities, additive precipitates, oxidation products, or moisture when stored statically in the storage tank for a long time, the filter screen ensures that the oil entering the fixed pipe 100 is first filtered. These heavier particles are effectively blocked by the filter screen when the oil starts flowing, preventing them from entering the subsequent fixed pipe 100.

In other embodiments (not shown), the filter screen is replaced with a three-layer composite structure: outer layer-stainless steel coarse filter screen to intercept fibers and large particles; middle layer-sintered metal microporous layer to capture additive precipitates; inner layer-oleophilic and hydrophobic membrane to block water and oxidation colloids. This structure provides better filtration performance.

In other embodiments (not shown), a snap-on filter screen frame (non-welded) is installed between the mounting plates 640. The filter screen adopts a three-layer composite structure but is designed as a cylindrical screw-in type, with a rotating handle and sealing cover at the top of the filter screen frame. When replacing or cleaning the filter screen, the sealing cover is unscrewed, and the entire filter screen module is rotated and pulled out through the handle. After replacing or cleaning, the module is reinstalled by reversing the steps.

In other embodiments (not shown), physical connectors such as the connecting plate 610 or mounting plate 640 are eliminated. A permanent magnet array is embedded at the bottom of the sealing plate 210, and an electromagnetic coil array is embedded at the corresponding position on the top of the oil outlet pipe 400. A displacement sensor is added to monitor the position of the oil outlet pipe. When the oil outlet pipe 400 is pulled, the displacement sensor detects the movement signal, and the controller supplies power to the electromagnetic coils according to preset logic, generating a magnetic field that attracts or repels the permanent magnets to drive the synchronous opening or closing of the sealing plate. This structure completely eliminates mechanical wear, achieves precise contactless linkage, and is suitable for sterile or ultra-clean environments.

In other embodiments, referring to FIGS. 2 and 3, the oil outlet pipe 400 is provided with a pressure balancing device. This device includes an air duct 700 installed on the inner wall of one side of the oil outlet pipe 400. The end of the air duct 700 located inside the fixed pipe 100 is provided with an air outlet 720, while the bottom end of the oil outlet pipe 400 has an air inlet 710 connected to the interior of the air duct 700. The end of the air duct 700 in contact with the air inlet 710 is open. When oil flows out of the oil outlet pipe 400, the internal pressure of the storage tank system decreases. At this point, air is drawn in through the air inlet 710, flows through the internal passage of the air duct 700, and finally enters the storage tank system through the air outlet 720. This process continuously replenishes gas volume, effectively maintaining pressure balance between the storage tank system and the external environment, preventing the formation of a vacuum (negative pressure) due to oil outflow. This fundamentally avoids potential issues such as pump cavitation, unstable oil flow, and deformation of the storage tank container.

In other embodiments (not shown), the air duct 700 structure is omitted, and a pressure balancing cavity is installed inside the fixed pipe 100. The cavity is connected to the exterior through a one-way intake valve. A vent hole is provided on the inner wall of the oil outlet pipe 400 to connect the pressure balancing cavity with the storage tank. During oil outflow, the negative pressure in the storage tank triggers the opening of the one-way intake valve. External air enters the storage tank through the path from the pressure balancing cavity to the vent hole, avoiding interference with oil flow caused by the air duct structure.

In other embodiments (not shown), the air duct 700 or pressure balancing cavity is retained. A flow sensor and humidity sensor are added at the air inlet 710 or vent hole, with a controller connected to the sensors and an audible-visual alarm. During normal oil outflow, the air flow rate is proportional to the oil outflow rate. If an abnormal increase in air flow is detected, it indicates seal failure (excessive external air ingress). If oil vapor is detected in the air (sudden humidity spike), it suggests internal oil leakage into the air duct. The controller triggers an alarm, enabling proactive seal status monitoring and enhancing safety performance.

In this embodiment, please refer to FIGS. 1 and 4. A limiting mechanism 800 is arranged on one side surface of the fixed pipe 100. The limiting mechanism 800 includes a sliding groove 810, which is provided on one side surface of the fixed pipe 100 and aligned with the sliding direction of the oil outlet pipe 400. The outer surface of the fixed pipe 100 at the bottom, below the sliding groove 810, is fixedly installed with a limiting block 820. The outer surface of the oil outlet pipe 400 is fixedly installed with a fixed block 830. One end of the fixed block 830, away from the oil outlet pipe 400, extends outside the fixed pipe 100 through the sliding groove 810 and contacts the upper surface of the limiting block 820. When the oil outlet pipe 400 slides to the lowest position of the fixed pipe 100, the limiting block 820 forcibly prevents the oil outlet pipe 400 from sliding further downward, defining the maximum outward pull position (to prevent the pipe from accidentally dislodging from the fixed pipe 100). Meanwhile, when the oil outlet pipe 400 moves to the end of the sliding groove 810 away from the limiting block 820, the fitting between the sliding groove 810 and the fixed block 830 limits the oil outlet pipe 400, thereby defining the minimum insertion depth of the oil outlet pipe 400 into the fixed pipe 100.

In other embodiments (not shown), a serrated track is added to the sidewall of the sliding groove 810, while the bottom of the fixed block 830 is hinged with an elastic pawl. When the oil outlet pipe 400 is pushed upward, the pawl slides along the serrated inclined surface. When the oil outlet pipe 400 is pulled downward, the pawl is engaged with the serrated recess to lock the position, and pressing the end of the pawl releases the engagement. Through this structure, the device can provide segmented travel locking to accommodate oil extraction needs from oil tanks of different depths.

In other embodiments (not shown), piezoelectric ceramic sheets are embedded on both sides of the sliding groove 810, the bottom of the fixed block 830 is fitted with a damping rubber layer, and the limiting block 820 is replaced with a shape-memory alloy (SMA) wedge block connected to an electric heating wire. When the device vibrates, the piezoelectric ceramics generate electricity to trigger the SMA heating wire, causing the SMA wedge block to expand and lock the fixed block. The piezoelectric current simultaneously acts on the electrorheological fluid in the rubber layer, instantly hardening it to absorb vibration energy. This is suitable for vibrating environments such as construction machinery and ships, preventing the oil outlet pipe 400 from dislodging due to limiting mechanism failure.

In other embodiments, referring to FIGS. 1 and 5, the limiting mechanism 800 further includes a limiting plate 860 disposed on the outer surface of the oil outlet pipe 400 and located below the fixed pipe 100. The upper surface of the limiting plate 860 is fixedly provided with a pressing plate 840. The outer surface of the fixed pipe 100 is provided with a limiting groove 850, which corresponds in position to the pressing plate 840. When the oil outlet nozzle needs to resume oil discharge, the pressing plate 840 presses against the top of the limiting groove 850, effectively preventing the oil outlet pipe 400 from excessive upward movement due to spring force, thereby avoiding potential component impact, wear, or loosening of connections.

In other embodiments, referring to FIG. 1, the distance between the limiting plate 860 and the fixed pipe 100 is equal to the length of the sliding groove 810. When the fixed block 830 moves to the end of the sliding groove 810 away from the limiting block 820, the limiting plate 860 contacts the top of the limiting groove 850.

Figure 9:
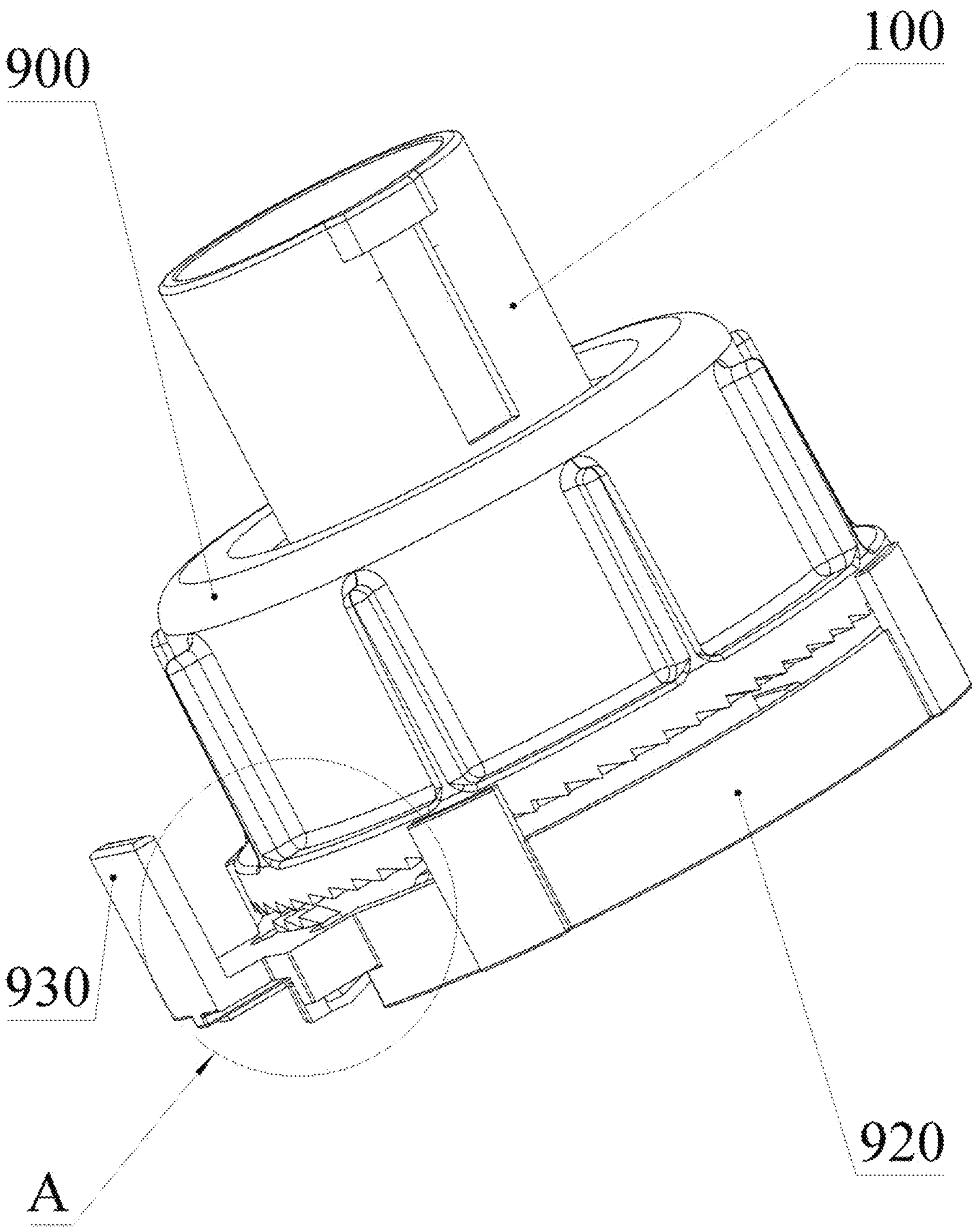
FIG. 9 is a structural schematic diagram of the threaded cap and the anti-return cap in another embodiment provided by the present disclosure.

In this embodiment, referring to FIG. 9, the outer surface of the fixed pipe 100 is fixedly provided with a threaded cap 900. The side of the threaded cap 900 facing the oil inlet 110 is the open end. By installing the threaded cap 900, the product can be securely mounted on the oil storage tank.

Figure 10:
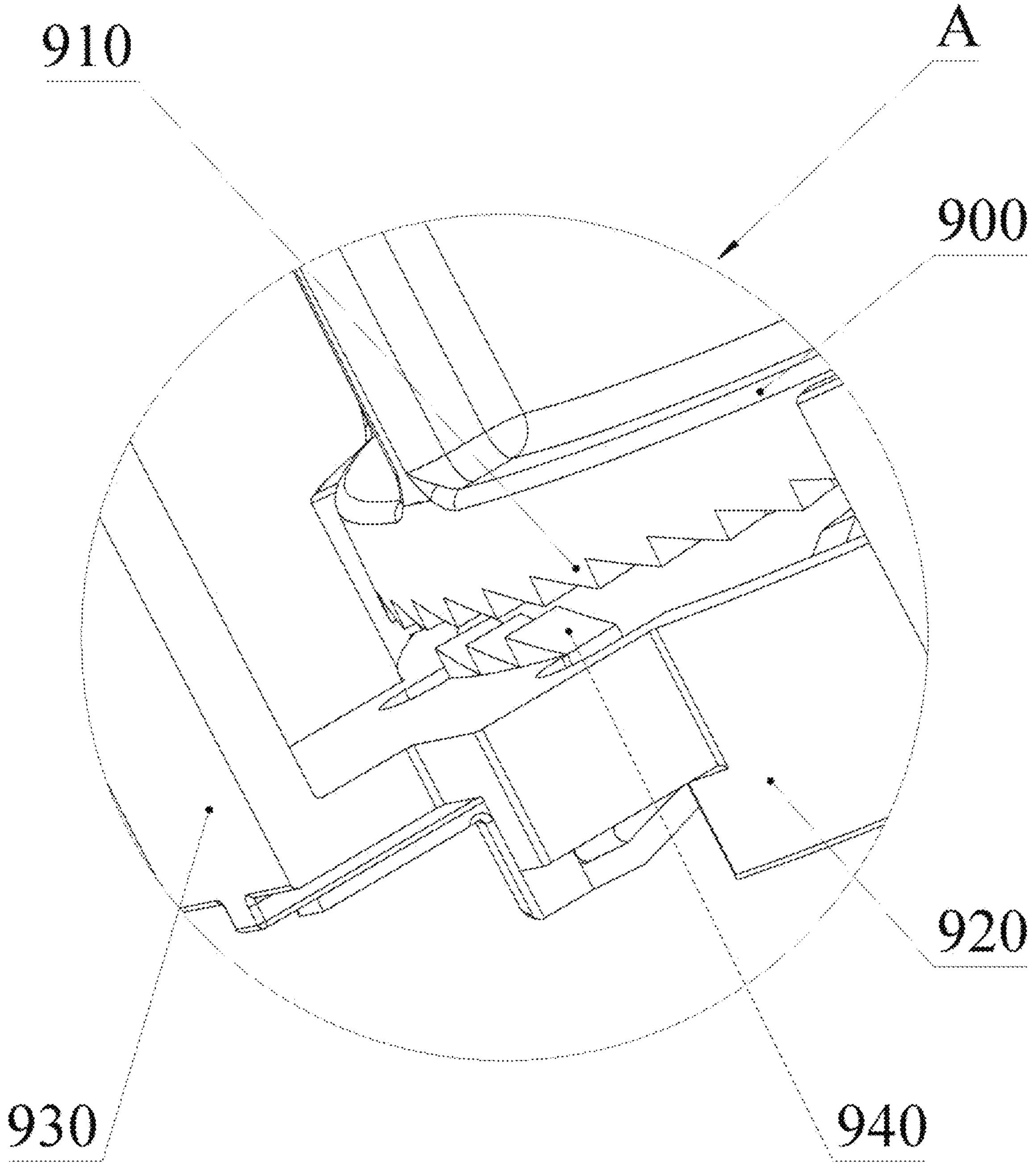
FIG. 10 is a structural schematic diagram of section A in the embodiment shown in FIG. 9.

In other embodiments, referring to FIGS. 9 and 10, the surface of the threaded cap 900 facing the oil inlet 110 is provided with helical teeth 910. The side of the threaded cap 900 with helical teeth 910 is provided with an anti-return cap 920, which snaps onto the oil barrel. The surface of the anti-return cap 920 facing the helical teeth 910 is fixedly provided with an L-shaped paddle 930. The surface of the paddle 930 facing the helical teeth 910 is fixedly provided with fixed teeth 940, whose tooth inclination direction is opposite to that of the helical teeth 910.

When the fixed pipe 100 is installed on the oil barrel through the threaded cap 900, since the tooth inclination direction of the fixed teeth 940 is opposite to that of the helical teeth 910, contact between the fixed teeth 940 and the helical teeth 910 restricts further rotation of the helical teeth 910, thereby limiting the rotation of the threaded cap 900. This prevents over-rotation of the threaded cap 900, ensuring that the fixed pipe 100 remains stable during oil discharge without deviation. When the fixed pipe 100 needs to be removed, the operator presses the paddle 930, causing it to deform and disengage the fixed teeth 940 from the helical teeth 910, allowing the threaded cap 900 to rotate and facilitating the removal of the fixed pipe 100.

In summary, as can be seen from the above description, the present disclosure achieves the following technical effects: Through the linkage structure 600, the oil outlet pipe 400 and the closing mechanism 200 each have an independent sealing system, physically isolating the first sealing member 300 from the second sealing member 500 while allowing them to operate independently; when the oil outlet pipe 400 experiences wear due to operation, the resulting gap changes will not transfer to the sealing interface of the closing mechanism 200, completely eliminating the risk of sealing failure caused by overall structural movement and ensuring long-term zero-leakage operation.

In the description of the present disclosure, it should be appreciated that directional terms such as “front, rear, up, down, left, right”, “horizontal, vertical, perpendicular, horizontal” and “top, bottom” etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms “inside, outside” refer to the inside and outside relative to the contour of each component itself.

For the convenience of description, spatial relative terms such as “on . . . ”, “above . . . ”, “on the upper surface of . . . ”, “upper” etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as “above other devices or structures” or “on other devices or structures” will subsequently be positioned as “below other devices or structures” or “under other devices or structures”. Thus, the exemplary term “above” can include both “above” and “below” orientations. The device can also be positioned in other different ways (rotated 90 degrees or in other orientations), and the spatial relative descriptions used here should be interpreted accordingly.

In addition, it should be noted that the use of terms such as “first”, “second” etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. An oil barrel outlet nozzle, comprising:
- a fixed pipe, comprising an oil inlet and an oil discharge port; and
- a closing mechanism arranged on the oil inlet of the fixed pipe, with a first sealing member at a bottom thereof for opening and closing an oil passage of the oil inlet; and
- an oil outlet pipe slidably inserted into the oil discharge port, with a second sealing member on an outer wall thereof for sealing a gap between the oil outlet pipe and the fixed pipe; and
- a linkage structure arranged between the oil outlet pipe and the closing mechanism;
- wherein the first sealing member and the second sealing member are physically isolated and operate independently; and
- the linkage structure converts an axial displacement of the oil outlet pipe into an opening/closing motion of the closing mechanism.

2. The oil barrel outlet nozzle according to claim 1, wherein the closing mechanism comprises a sealing plate.

3. The oil barrel outlet nozzle according to claim 2, wherein the first sealing member comprises an annular groove formed on an outer sidewall of the sealing plate, a first sealing ring is arranged inside the annular groove, and an annular protrusion is fixed on an inner wall of the fixed pipe opposite the annular groove, with one side of the first sealing ring in contact with a surface of the annular protrusion.

4. The oil barrel outlet nozzle according to claim 3, wherein the linkage structure comprises at least one connecting plate fixedly installed on a bottom surface of the sealing plate, with one end of the at least one connecting plate away from the sealing plate connected to a top of the oil outlet pipe; a limiting step is fixedly installed on a side of a bottom surface of the at least one connecting plate facing the fixed pipe, and a first spring is fixedly installed on a top of the limiting step, wherein the first spring is sleeved on a surface of the at least one connecting plate, and one end of the first spring away from the limiting step is connected to a bottom of the annular protrusion.

5. The oil barrel outlet nozzle according to claim 1, wherein the second sealing member comprises an annular recess formed on an outer edge of the oil outlet pipe, a second sealing ring is arranged inside the annular recess, and one side of the second sealing ring is in contact with an outer surface of the fixed pipe.

6. The oil barrel outlet nozzle according to claim 1, further comprising a pressure balancing device comprising:
- an air duct, with an air outlet provided at one end of the air duct located inside the fixed pipe; and
- an air inlet provided at a bottom of the oil outlet pipe and connected to an interior of the air duct.

7. The oil barrel outlet nozzle according to claim 1, further comprising a limiting mechanism comprising:
- a sliding groove axially provided on a side wall of the fixed pipe; and
- a fixed block fixedly connected to an outer wall of the oil outlet pipe and extending into the sliding groove; and
- a limiting block arranged at a bottom end of the sliding groove to prevent the fixed block from disengaging.

8. The oil barrel outlet nozzle according to claim 7, wherein the limiting mechanism further comprises:
- a limiting plate fixedly installed on the outer wall of the oil outlet pipe; and
- a pressing plate fixedly installed on an upper surface of the limiting plate; and
- a limiting groove formed on an outer surface of the fixed pipe.

9. The oil barrel outlet nozzle according to claim 1, wherein an outer surface of the fixed pipe is fixedly installed with a threaded cap, and a side of the threaded cap facing the oil inlet is an open end.

10. The oil barrel outlet nozzle according to claim 9, wherein a surface of the threaded cap facing the oil inlet is provided with helical teeth.

11. The oil barrel outlet nozzle according to claim 10, wherein the side of the threaded cap with the helical teeth is provided with an anti-return cap snapped onto an oil barrel, a surface facing the helical teeth is fixedly installed with an L-shaped paddle, and a surface of the L-shaped paddle facing the helical teeth is fixedly installed with fixed teeth, wherein an inclination direction of the fixed teeth is opposite to that of the helical teeth.

* * * * *